United States Patent [19]
Azami

[11] Patent Number: 5,889,842
[45] Date of Patent: Mar. 30, 1999

[54] COMMUNICATION SYSTEM HAVING A CHANGEABLE CALLING MODE AND TERMINAL USED IN THE COMMUNICATION SYSTEM

[75] Inventor: Toshihiro Azami, Kawasaki, Japan

[73] Assignee: Fujitsu Limited, Kawasaki, Japan

[21] Appl. No.: 555,139

[22] Filed: Nov. 8, 1995

[30] Foreign Application Priority Data

Apr. 6, 1995 [JP] Japan ................................ 7-081451

[51] Int. Cl.$^6$ ............................................... H04M 11/00
[52] U.S. Cl. ........................... 379/93.09; 379/100.15; 358/468
[58] Field of Search ................ 379/93, 94, 96, 379/97, 98, 100, 100.15–100.16, 93.09, 93.11; 375/219, 220, 222; 358/434, 435, 436, 438, 468

[56] References Cited

U.S. PATENT DOCUMENTS

| | | | |
|---|---|---|---|
| 4,677,660 | 6/1987 | Yoshida | 379/100.15 |
| 4,815,121 | 3/1989 | Yoshida | 379/100.15 |
| 4,908,851 | 3/1990 | Kotani et al. | 358/434 |
| 5,018,189 | 5/1991 | Kurosawa et al. | 379/100.15 |
| 5,202,915 | 4/1993 | Nishii | 379/100.15 |
| 5,222,126 | 6/1993 | Nishino | 379/100.15 |
| 5,239,385 | 8/1993 | Ejiri | 379/100.15 |
| 5,255,311 | 10/1993 | Yoshida | 358/468 |
| 5,448,378 | 9/1995 | Matsumoto | 358/435 |
| 5,487,105 | 1/1996 | Sakai | 379/100.15 |
| 5,493,609 | 2/1996 | Winseck, Jr. et al. | 379/100.15 |
| 5,550,649 | 8/1996 | Wong et al. | 358/468 |

FOREIGN PATENT DOCUMENTS

| | | |
|---|---|---|
| 2-026170 | 1/1990 | Japan . |
| 4-020050 | 1/1992 | Japan . |
| 4-207555 | 7/1992 | Japan . |
| 5-284251 | 10/1993 | Japan . |

*Primary Examiner*—Curtis A. Kuntz
*Assistant Examiner*—Xu Mei
*Attorney, Agent, or Firm*—Staas & Halsey

[57] ABSTRACT

A communication system has a first communication terminal and a second communication terminal connected to a network. Communication can be performed by the first and second communication terminals in a plurality of modes. The first communication terminal has a detecting unit to detect calls that are refused by the second communication terminal and that are performed in a first mode when a second mode has been set. Based on the detection of the detecting unit, a first calling unit calls the second communication terminal in the second mode. Using the second mode, when the call from the first calling unit is accepted, a mode switching instruction unit instructs the second communication terminal to switch from the second mode to the first mode. Based on a response to an instruction from the mode switching instruction unit, a second calling unit calls the second communication terminal in the first mode. The second communication terminal includes a mode switching response unit. Upon receiving the instruction from the mode switching instruction unit, the mode switching response unit responds to the instruction using the second mode. After the response is returned, a mode switching unit switches the mode from the second mode to the first mode.

5 Claims, 9 Drawing Sheets

FIG.6

| MESSAGE | DTMF | MEANING |
|---|---|---|
| START | 1 | START COMMAND OF NEGOTIATION |
| AGREEMENT | 2 | AGREEMENT WITH COMMAND |
| SETTING | 3 | COMMAND FOR REQUESTING TO SET A STATE WHERE TERMINAL SHOULD BE CALLED IN MODE I |
| COMPLETION | 4 | COMPLETION OF PREPARATION FOR RECEIVING CALL IN MODE I |
| | 5~9, 0, *, # | RESERVE |

COMMUNICATION SYSTEM HAVING A CHANGEABLE CALLING MODE AND TERMINAL USED IN THE COMMUNICATION SYSTEM

BACKGROUND OF THE INVENTION (1) Field of the Invention

The present invention generally relates to a communication system capable of changing a calling mode and a terminal used in the communication system, and more particularly to use of a terminal in a communication system constructed in a network, such as an ISDN, to which terminals can be connected in a plurality of modes, and in which a mode can be changed between terminals.

(2) Description of the Related Art

In a communication system constructed in an ISDN, each terminal can communicate with another terminal in any of a plurality of modes, such as an audio communication mode, a 64 kbps data communication mode and the like. In a communication system constructed in a network to which terminals can be in a plurality of modes, if a specific mode of a calling terminal is not set in a terminal that is being called, the calling terminal recognizes that the called terminal is in a busy state.

A user of the calling terminal which recognizes that the called terminal is in the busy state must repeatedly recall by changing the mode until the changed mode is the same as the mode set in the called terminal. As a result, it is often difficult and time consuming to connect the terminal to the network.

SUMMARY OF THE INVENTION

Accordingly, a general object of the invention is to provide a novel and useful communication system and a terminal used in the communication system in which the disadvantages of the aforementioned prior art are eliminated.

A more specific object of the present invention is to provide a communication system constructed in a network to which terminals can be connected in a plurality of modes, in which even if a calling mode set in a calling terminal differs from a mode set in a called terminal, the calling mode is automatically changed so that the calling terminal can communicate with the called terminal in the same mode.

The above objects of the present invention are achieved by a communication system comprising a first communication terminal connected to a network in which communication can be performed in a plurality of modes; and a second communication terminal connected to the network. The first communication terminal comprises: detecting means for detecting that a call performed in a first mode for the second communication terminal in which a second mode has been set is not accepted by the second communication terminal; first calling means for, when the detecting means detects that the call is not accepted by the second communication terminal, searching for the second mode set in the second communication terminal and calling for the second communication terminal in the second mode; mode switching instruction means for, when the call by the calling means is accepted by the second communication terminal, instructing, using the second mode, the second communication terminal to switch from the second mode to the first mode; and second calling means for, when receiving from the second communication terminal a response to an instruction from the mode switching instruction means, calling the second communication terminal in the first mode. The second communication terminal comprises: mode switching response means for, when receiving the instruction from the mode switching instruction means of the first communication terminal, returning to the first communication terminal a response to the instruction using the second mode; and mode switching means for, after the mode switching response means returns the response, switching from the second mode to the first mode.

The above objects of the present invention are also achieved by a communication system comprising: a first communication terminal connected to a network in which communication can be performed in a plurality of modes, that has an audio communication mode in which voice communication can be performed and set in the first communication terminal; and a second communication terminal connected to the network, in which an audio communication mode is set. The first communication terminal comprises: detecting means for detecting that a call performed in a predetermined mode for the second communication terminal in which the audio mode has been set is not accepted by the second communication terminal; first calling means for, when the detecting means detects that the call is not accepted by the second communication terminal, calling the second communication terminal in the audio mode; telephone call means for, when a call by the first calling means is accepted by the second communication terminal, performing a telephone conversation between users of the first communication terminal and second communication terminal; and second calling means for calling the second communication terminal in the predetermined mode in accordance with an instruction from the user, that the another mode set in the second communication terminal has been switched to the predetermined mode.

According to the present invention, the mode set in the second terminal (a called terminal) can be automatically switched to the predetermined mode. Thus, even if a calling mode set in a calling terminal differs from a mode set in the called mode, the calling terminal can communicate with the called terminal in the same mode.

The object of the present invention is achieved by a communication terminal connected to a network in which communication can be performed in a plurality of modes, the communication terminal comprising: detecting means for detecting that a call performed in a first mode for another communication terminal in which a second mode has been set is not accepted by the another communication terminal; first calling means for, when the detecting means detects that the call is not accepted by the another communication terminal, searching for the second mode set in the another communication terminal and calling the another communication terminal in the second mode; mode switching instruction means for, when the call by the calling means is accepted by the another communication terminal, instructing, using the second mode, the another communication terminal to switch from the second mode to the first mode; and second calling means for, when receiving from the another communication terminal a response to an instruction from the mode switching instruction means, calling the another communication terminal in the first mode.

The above object of the present invention is also achieved by a communication terminal connected to a network in which communication can be performed in a plurality of modes, the communication terminal in which a predetermined mode has been set comprising: mode switching response means for, when receiving from another communication terminal an instruction to switch from the predetermined mode to another mode, returning to the another communication terminal a response to the instruction using a predetermined mode; and mode switching means for, after the mode switching response means returns the response, switching from the predetermined mode to the another mode.

Further, the above object of the present invention is also achieved by a communication terminal connected to a network in which communication can be performed in a plurality of modes, that has an audio mode in which voice conversation can be set in the communication terminal, the communication terminal comprising: detecting means detecting that a call performed in a predetermined mode for another communication terminal in which the audio mode has been set is not accepted by the another communication terminal; first calling means for, when the detecting means detects that the call is not accepted by the another communication terminal, calling the another communication terminal in the audio mode; telephone call means for, when a call by the first calling means is accepted by the another communication terminal, performing a telephone conversation between users of the communication terminal and the another communication terminal; and second calling means for calling the another communication terminal in the predetermined mode in accordance with an instruction from the user, that the another mode set in the another communication terminal has been switched to the predetermined mode.

According to the present invention, a communication terminal used in the above communication system can be provided.

BRIEF DESCRIPTION OF THE DRAWINGS

Other objects, features and advantages of the present invention will become apparent from the following detailed description when read in conjunction with the accompanying drawings, in which:

FIG. 6 is a table illustrating relationships between DTMF signals and messages;

DESCRIPTION OF THE PREFERRED EMBODIMENT

A description will be given of an embodiment of the present invention.

Figure 1:
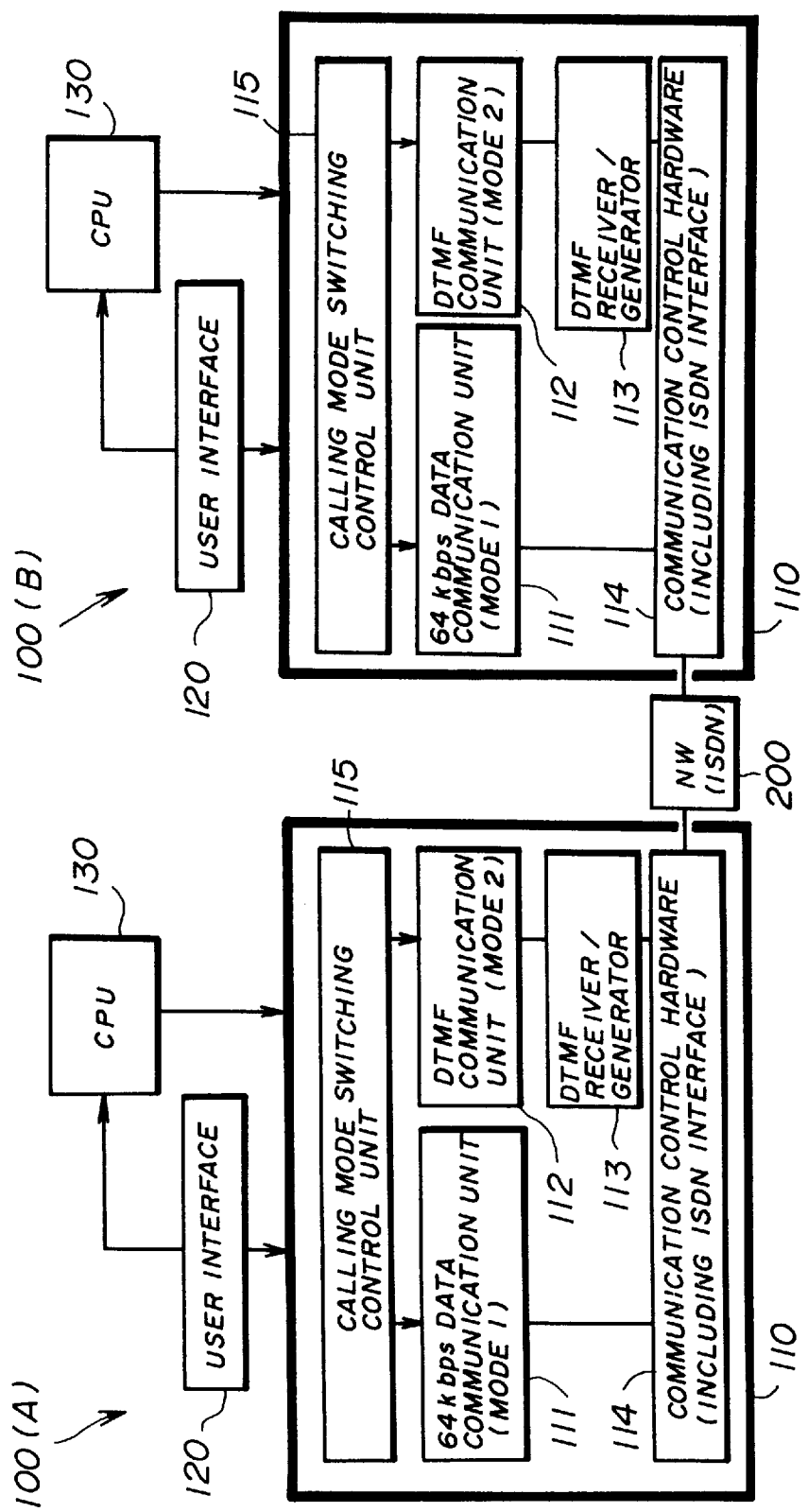
FIG. 1 is a block diagram illustrating a communication system according to an embodiment of the present invention.

A communication system according to a preferred embodiment of the present invention is formed as shown in FIG. 1. Referring to FIG. 1, terminals 100(A) and 100(B) are connected to a network (ISDN) 200 so as to communicate with each other via the network 200. Each of the terminals 100(A) and 100(B) has a communication unit 110, a user interface 120 and a CPU (Central Processing Unit) 130. The user interface 120 includes input devices such as a keyboard and a mouse. Information based on operations of a user is supplied from the input device to the communication unit 110 and the CPU 130. The CPU 130 controls the communication unit 110 based on the information supplied from the user interface 120.

The communication unit 110 has a data communication unit 111, DTMF (Dual Tone Multi-Frequency button dialing signal) communication unit 112, a DTMF receiver/generator 113, a communication control hardware 114 and a calling mode switching control unit 115. The data communication unit 111 is activated when a mode 1 for a 64 kbps data communication is set. The data communication unit 111 which is activated carries out a call control in a D channel and data processing in a B channel, in accordance with predetermined procedures. The DTMF communication unit 112 is activated when a mode 2 for the audio communication is set. The DTMF communication unit 112 which is activated carries out a call control in a D channel for the audio communication and processes for the audio communication using audio signals, such as DTMFs which are number tone signals of push-button-phones processed as audio data in a B channel. The DTMF receiver/generator 113 codes the DTMFs and decodes the coded DTMFs, based on instructions from the DTMF communication unit 112. The calling mode switching control unit 115 carries out processes for a call control based on a calling request from the user interface 120.

An actual terminal is provided with a voice call unit (not shown) by which a user directly calls a destination by voice. The DTMF communication unit 112 and the DTMF receiver/generator 113 are added to the voice call unit.

The communication control hardware 114 includes an ISDN interface connecting the terminal and the network (ISDN) 200. Information from the data communication unit 111 and the DTMF communication unit 112 is supplied to the network (ISDN) 200 by the communication control hardware 114. The communication control hardware 114 receives information from the network (ISDN) 200 and supplies the information to the data communication unit 111 and the DTMF communication unit 112.

Figure 2:
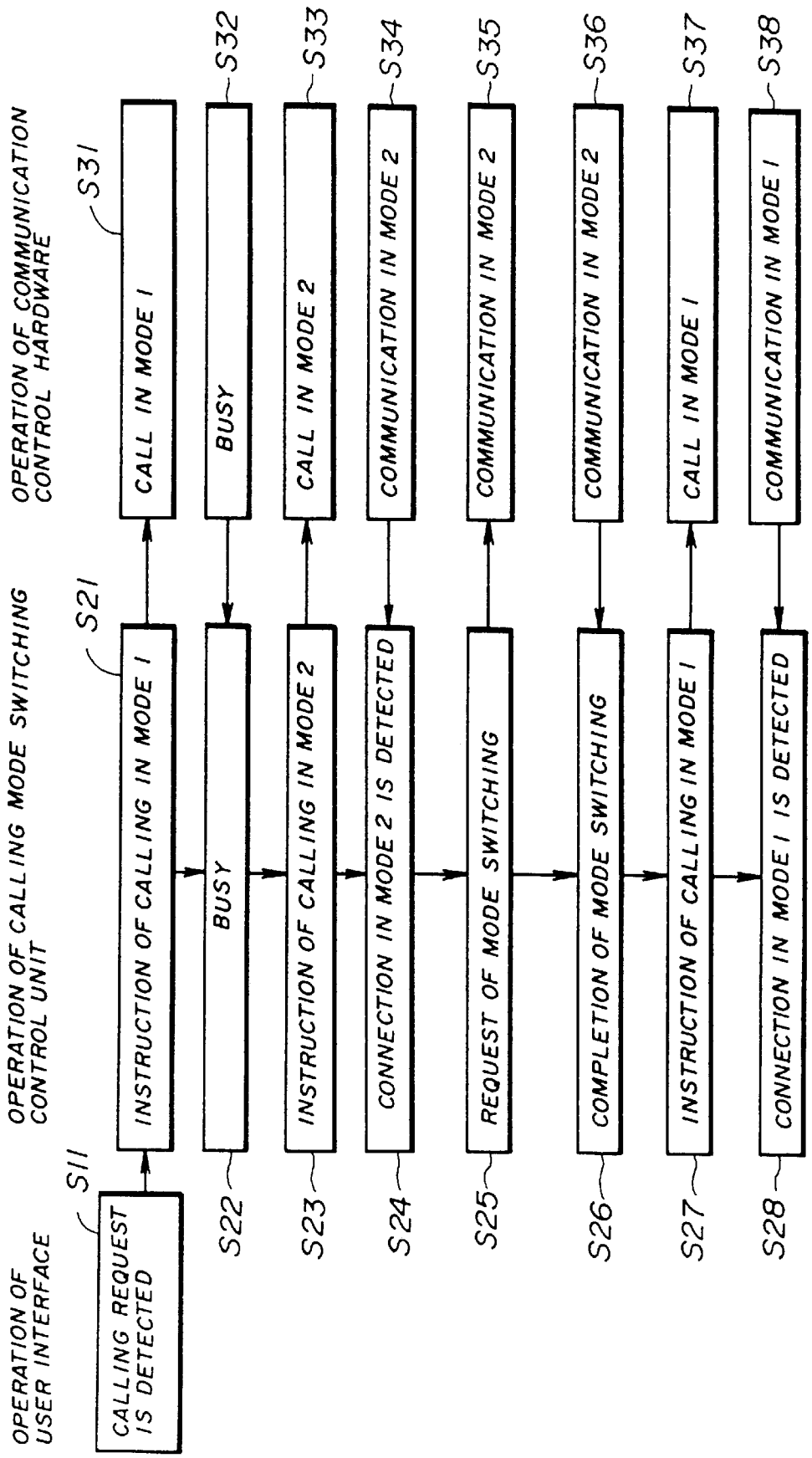
FIG. 2 is a flowchart illustrating processing procedures in a terminal to which a calling in a mode 1 is requested.

For example, in a case where the terminal 100(A) calls the terminal 100(B), the user interface 120, the calling mode switching control unit 115, and the communication control hardware of the terminal 100(A) operate in accordance with procedures shown in FIG. 2. In this case, the calling mode switching control unit 115 and the communication control hardware of the terminal 100(B) operate in accordance with procedures shown in FIG. 3. Communication between the terminals 100(A) and 100(B) is performed in accordance with a procedure shown in FIG. 4.

Figure 3:
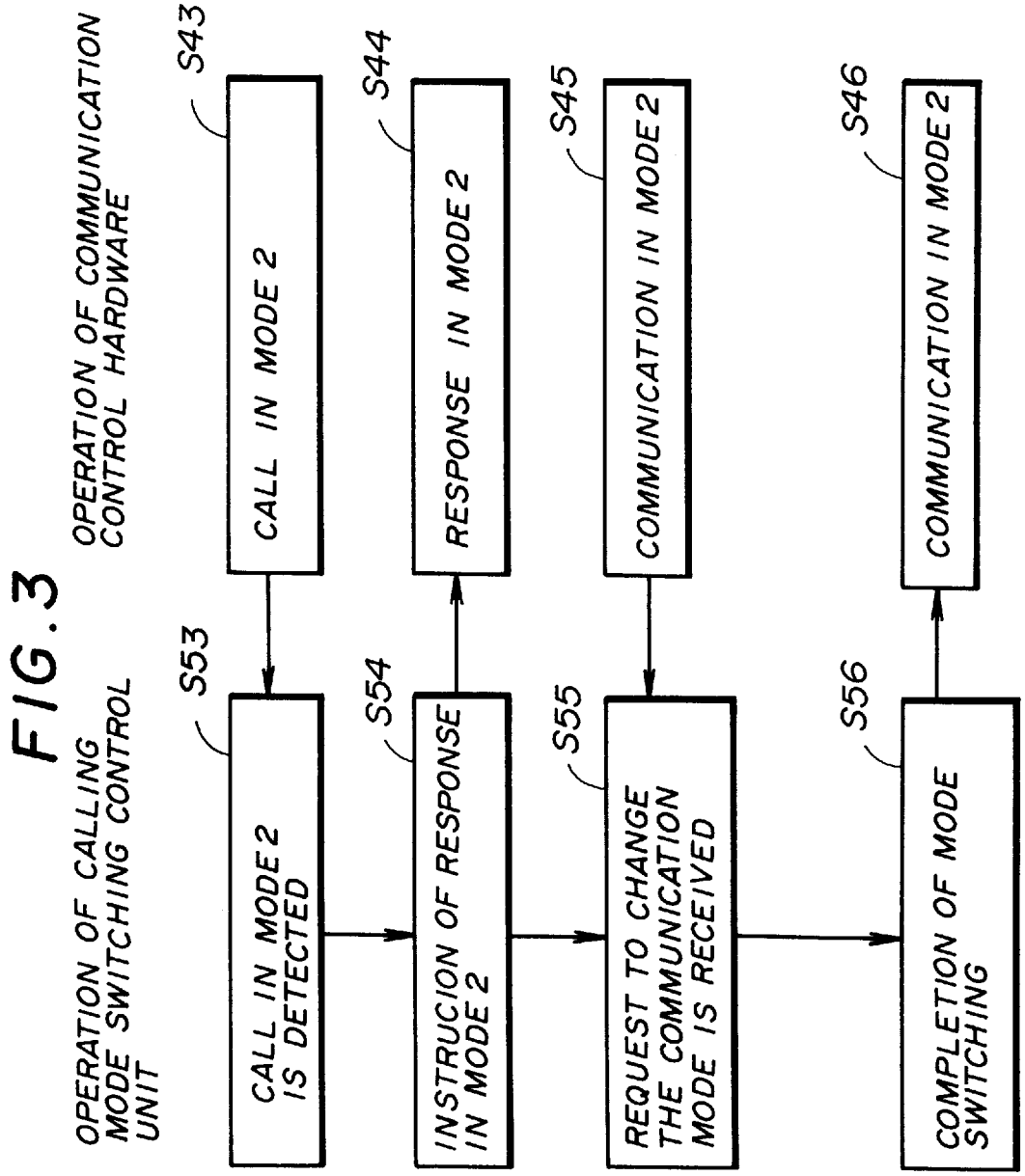
FIG. 3 is a flowchart illustrating processing procedures in a terminal called in a mode 1 in a state where a mode 2 has been set therein.
Figure 4:
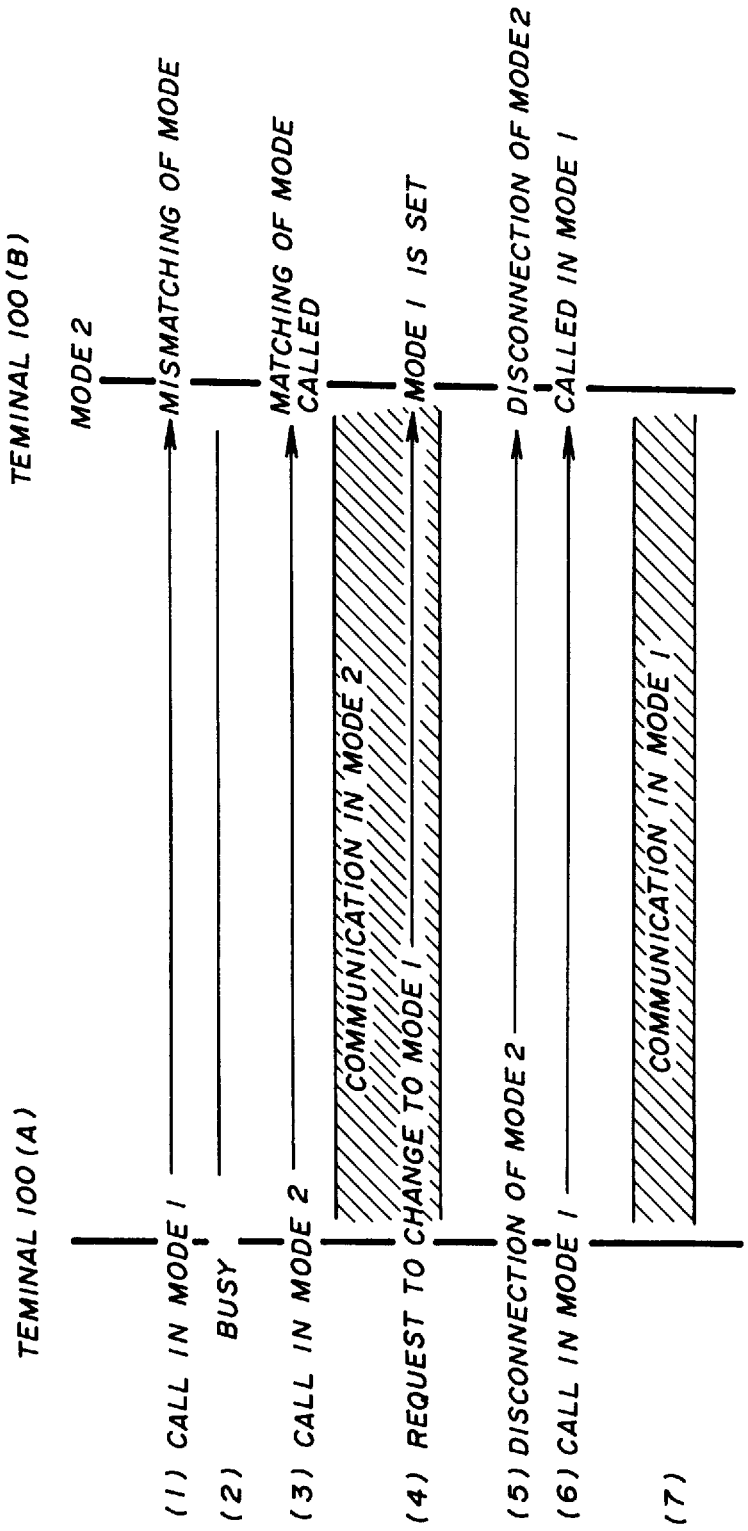
FIG. 4 is a diagram illustrating a communication procedure between terminals.

Referring to FIGS. 2, 3 and 4, when the user interface 120 detects a calling request in the mode 1 (the 64 kbps data communication), input by a user using the input device (step S11 in FIG. 2), the calling mode switching control unit 115 is informed of the detecting result. The calling mode switching control unit 115 instructs the data communication unit 111 corresponding to the mode 1 to call in the mode 1 (S21 in FIG. 2). The data communication unit 111 then performs a calling process. In response to the calling process, the communication control hardware 114 supplies to the network (ISDN) 200 a call in the mode 1 to the terminal 100(B) (S31 in FIG. 2).

The terminal 100(B) has been set, for example, in the mode 2 (the audio communication mode), so that the DTMF communication unit 112 has been activated. When the terminal 100(B) is called in the mode 1, the terminal 100(B) returns to the network (ISDN) a mode mismatching signal indicating mismatch of modes (see FIG. 4 (1)). As a result, the communication control hardware 114 of the terminal 100(A) detects, based on the mode mismatching signal, that the terminal 100(B) called in the mode 1 is in a busy state (S32 in FIG. 2). This information is then supplied to the calling mode switching control unit 115 via the data communication unit 111. The calling mode switching control unit 115 recognizes that the terminal 100(B) is in the busy state (S22 in FIG. 2 and see FIG. 4 (2)).

The calling mode switching control unit 115 of the terminal 100(A) searches for a mode in which the terminal 100(A) can be communicate with the destination terminal 100(B). In this embodiment, the system has only two modes (the 64 kbps data communication mode and the DTMF communication mode (the audio communication mode)) which can be set in the respective terminals. Thus, the calling mode switching control unit 115 automatically supplies a calling instruction to the DTMF communication unit 112 corresponding to the mode 2. The DTMF communication 112 receiving the calling instruction performs a calling operation, and communication control hardware 114 supplies to the network (ISDN) 200 a call-out in the mode 2 for the terminal 100(B) (S33 in FIG. 2).

When the communication control hardware 114 of the terminal 100(B) receives a call-in in the mode 2 from the network (ISDN) 200 (S43 in FIG. 3), the communication control hardware 114 supplies this information to the calling mode switching control unit 115 via the DTMF communication unit 112. As a result, the calling mode switching control unit 115 of the terminal 100(B) recognizes that the terminal 100(B) has been called in the mode 2 (S53 in FIG. 3). In this case, the calling mode and the mode set in the terminal 100(B) are matched with each other, so that the calling mode control unit 115 supplies to the DTMF communication unit 112 an instruction of a response in the mode 2 (S54 in FIG. 3 and see FIG. 4 (3)). The DTMF communication unit 112 performs, in accordance with the instruction, a process for the response. The communication control hardware 114 thus supplies a response signal in the mode 2 to the network (ISDN) 200 (S44 in FIG. 3).

When the communication control hardware 114 of the terminal 100(A) receives the response signal transmitted in the mode 2 from the terminal 100(B), the DTMF communication unit 112 corresponding to the mode 2 and the DTMF receiver/generator 113 are connected to the network (ISDN) 200 via the communication control hardware 114 (S34 in FIG. 2). The calling mode switching control unit 115 then detects the terminal 100(A) has been connected in the mode 2 to the network (ISDN) 200 (S24 in FIG. 2). Thus, the terminals 100(A) and 100(B) both of which are connected to the network (ISDN) 200 are in a state where they communicate with each other in the mode 2. In the above process, the user is not informed that the mode 1 requested by the user has been changed to the mode 2.

In this state, the calling mode switching control unit 115 of the terminal 100(A) instructs the DTMF communication unit 112 to request the terminal 100(B) to change the mode 2 to the mode 1 (S25 in FIG. 2). After this, the communication in the mode 2 starts between the terminals 100(A) and 100(B) (see FIG. 4 (4)). That is, in the terminal 100(A), based on the control information from the DTMF communication unit 112, the DTMF receiver/generator 113 makes a request message, using DTMF signal, that the mode 2 is switched to the mode 1. The request message is supplied to the network (ISDN) 200 via the communication control hardware 114 for the terminal 100(B) (S35 in FIG. 2).

The communication hardware 114 of the terminal 100(B) receives the request message from the network (ISDN) 200, which is supplied to the DTMF receiver/generator (S45 in FIG. 3). The DTMF receiver/generator 113 decodes the request message. The decoded request message is supplied to the calling mode switching control unit 115 via the DTMF communication unit 112. As a result, the calling mode switching control unit 115 of the terminal 100(B) recognizes a request, from the terminal 100(A), to change the mode 2 to the mode 1. (S55 in FIG. 3).

The calling mode switching control unit 115 of the terminal 100(B) then supplies instructions to the DTMF communication unit 112 to inform the terminal 100(A) of completion of switching to the mode 1 (S56 in FIG. 3). Then, based on the control information from the DTMF communication unit 112, the DTMF receiver/generator 113 makes a completion message, using the DTMF signals, that the mode switching has been completed. The completion message is supplied to the network (ISDN) 200 via the communication control hardware 114 for the terminal 100(A) (S46 in FIG. 3).

The communication control hardware 114 of the terminal 100(A) receives the completion message from the network (ISDN) 200, which is supplied to the DTMF receiver/generator 113. The DTMF receiver/generator 113 then decodes the completion message. The decoded completion message is supplied to the calling mode switching control unit 115 via the DTMF communication unit 112. As a result, the calling mode switching control unit 115 of the terminal 100(A) recognizes that the mode set in the terminal 100(B) has been changed to the mode 1 (S26 in FIG. 2).

After this, a request to disconnect the communication in the mode 2 is transmitted from the terminal 100(A) to the terminal 100(B), and the terminals 100(A) and 100(B) disconnect the communication in the mode 2 (see FIG. 4 (5)). That is, in each of the terminals 100(A) and 100(B), the calling mode switching control unit 115 releases the DTMF communication unit 112 from a state of connection to the network via the communication control hardware 114. The calling mode switching control unit 115 then activates the data communication unit 111 substituted for the DTMF communication unit 112. As a result, the data communication unit 111 is connected to the network (ISDN) 200 via the communication control hardware 114.

If a plurality of channels can be simultaneously connected to the network (for example, two B-channels can be connected to the ISDN), a plurality of calls can be performed in parallel using the plurality of channels. For example, if a second B-channel is unused while another call is being executed in the mode 2 using a first B-channel, a call may be additionally executed in the mode 1 using the second single B-channel. In this case, if the call in mode 2 is not needed, only the call in mode 2 may be disconnected.

Figure 5:
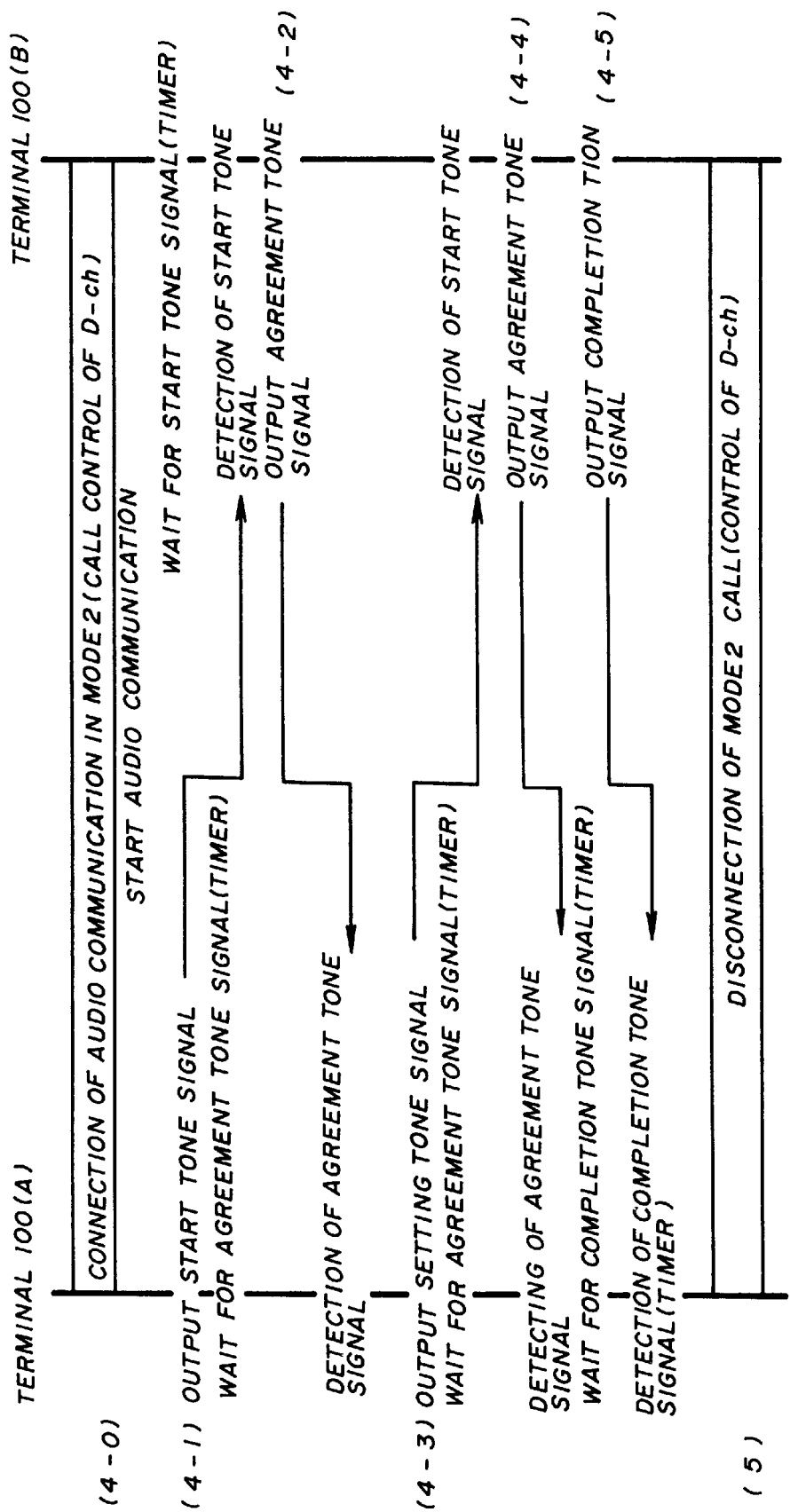
FIG. 5 is a diagram illustrating a negotiation procedure for adjusting a mode between terminals.

The above communication (negotiation) for switching from the mode 1 to the mode 2 between the terminals 100(A) and 100(B) is executed using the DTMF signals as shown in FIG. 5.

In this case, the DTMF generator/receiver 113 of each of the terminals 100(A) and 100(B) has a table indicating, as shown in FIG. 6, relationships between the respective DTMF signals and messages (start, agreement, setting and completion). The DTMF generator/receiver 113 codes a message and decodes a coded message, with reference to the table.

Referring to FIG. 5, when the terminals 100(A) and 100(B) are connected to the network (ISDN) 200 in the audio communication mode (the mode 2) (4-0), the terminal 100(A) outputs a start tone signal (DTMF "1") meaning a start command of the negotiation (4-1). At this time, the terminal 100(B) is in a waiting state for the start tone signal. When the terminal 100(B) detects the start tone signal, the terminal 100(B) outputs an agreement tone signal (DTMF "2") meaning agreement with a command (4-2). After outputting the start tone signal, the terminal 100(A) is in a waiting state for the agreement tone signal. When the terminal 100(A) detects the agreement tone signal from the terminal 100(B), the terminal 100(A) outputs a setting tone signal (DTMF "3") meaning a command for requesting to set a state where the terminal 100(A) should be called in the mode 1 (4-3).

After outputting the agreement tone signal, the terminal 100(B) is in a waiting state for the setting tone signal. When the terminal 100(B) detects the setting tone signal from the terminal 100(A), the terminal 100(B) outputs the agreement tone signal (DTMF "2"). The terminal 100(B) then makes preparations for switching from the mode 2 to the mode 1. After outputting the setting tone signal, the terminal 100(A) is in a waiting state for the agreement tone signal. When the terminal 100(A) detects the agreement tone signal from the terminal 100(B), the terminal 100(A) assumes a waiting state for a completion tone signal.

In this state, when the preparations for switching from the mode 2 to the mode 1 are completed in the terminal 100(B), the terminal 100(B) outputs the completion tone signal (DTMF "4") (4-4). When the terminal 100(B) which has been in the waiting state for the completion tone signal then detects the completion tone signal, a disconnecting process for disconnecting the communication in the mode 2 is executed between the terminals 100(A) and 100(B) (5).

Returning to FIGS. 2 and 4, after the negotiation relating to switching the mode is executed in the mode 2 (the audio communication mode) between the terminals 100(A) and 100(B) so that the communication mode is switched from the mode 2 to the mode 1 (the 64 kbps data communication mode), the calling mode switching control unit 15 of the terminal 100(A) supplies to the data communication unit 111 a calling instruction (S27 in FIG. 2). The data communication unit 111 thus performs a predetermined calling process. Based on the calling process of the data communication unit 111, the communication control hardware 114 outputs a call for the terminal 100(B) to the network (ISDN) 200 (S37 in FIG. 2, see FIG. 4 (6).

In the terminal 100(B), the communication mode has been switched to the mode 1 (the data communication mode). Thus, when the terminal 100(B) is called in the mode 1 by the terminal 100(A), the terminal 100(B) returns a response signal to the terminal 100(A). The communication control hardware 114 of the terminal 100(A) receives the response signal from the terminal 100(B). The data communication unit 112 corresponding to the mode 1 is then connected to the network (ISDN) 200 via the communication control hardware 114 (S38 in FIG. 2). The calling mode switching control unit 115 recognize that the terminal 100(A) has been connected to the network (ISDN) 200 in the mode 1 (the data communication mode) (S28 in FIG. 2).

After this, the terminals 100(A) and 100(B) perform communication in mode 1 (the 64 kbps data communication mode) based on operation inputs of the users (see FIG. 4 (7)).

According to the above embodiment, in a case where the terminal 100(A) calls, in the mode 1, the terminal 100(B) in which the communication mode is initially set in the mode 1, the communication mode of the terminal 100(B) is automatically switched to the mode 1. The communication is then performed in the mode 1 between the terminals 100(A) and 100(B). Thus, the user of the terminal 100(A) is not aware of switching the communication mode, and the communication can be performed in a communication mode desired by the user between the terminals 100(A) and 100(B).

In the above embodiment, the 64 kbps data communication mode and the audio communication mode are respectively used as the mode 1 and the mode 2 in which the terminals 100(A) and 100(B) can communicate with each other. However, in the present invention, the communication modes used as the mode 1 and the mode 2 are not limited to the above. More than two communication modes may be used in the system. Further, a G4-FAX mode and a V.100 mode may be used in the system. In a case where more than two communication modes can be used in the system, the switching of the communication mode is performed a plurality of times to search for a communication mode set in a destination terminal.

A description will now be given of another embodiment of the present invention.

Figure 7:
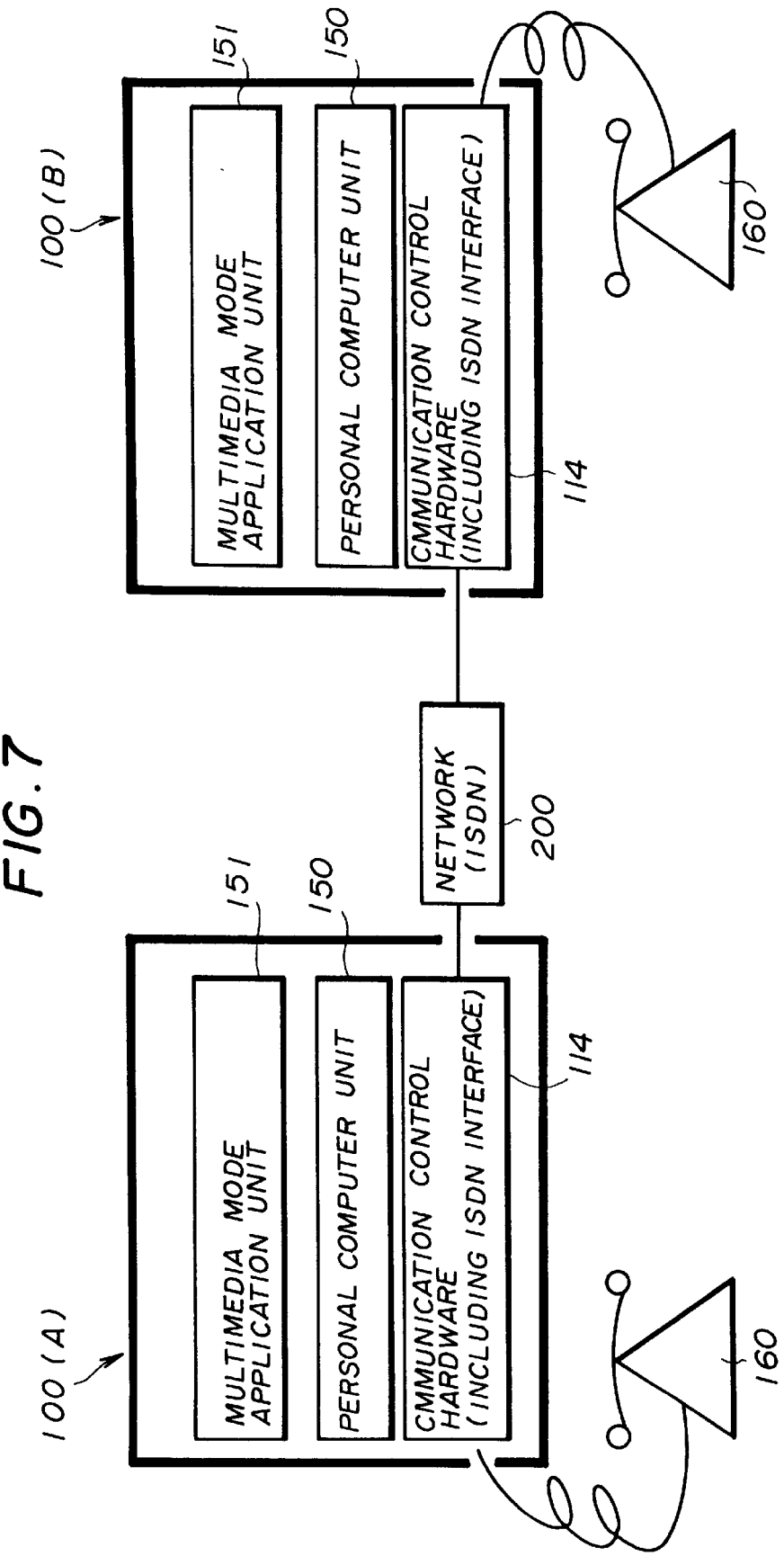
FIG. 7 is a block diagram illustrating a communication system according to another embodiment of the present invention.

A communication system according to a preferred embodiment of the present invention is formed as shown in FIG. 7. In this communication system, communication can be performed in a multimedia mode in which audio signals and data can be transmitted using the same channel.

Referring to FIG. 7, the terminals 100(A) and 100(B) are connected to the network (ISDN) 200 so as to communicate with each other in the same manner as in the above embodiment shown in FIG. 1. Each of the terminals 100(A) and 100(B) is a communication terminal formed on the basis of a personal computer, and has a personal computer unit 150, a multimedia mode application unit 151 and the communication control hardware 114. The personal computer unit 150 controls the multimedia mode application unit 151 so as to execute a communication application in the multimedia mode. The multimedia mode application 151 includes software for switching control of the calling mode and software for call control in the multimedia mode. In addition, the personal computer unit 150 includes a user interface.

The communication control hardware 114 includes an ISDN interface, and performs the call control in the audio communication mode based on instructions from the personal computer unit 150. A hand-set 160 used for calling is connected to the communication control hardware 114. Users A and B of the terminals 100(A) and 100(B) can talk with each other (a telephone conversation) in the audio communication mode and in the multimedia mode using the hand-sets 160.

In both the terminals 100(A) and 100(B), the audio communication can be performed without regard to the execution of the application, and the multimedia mode communication can be performed running the multimedia mode application program.

Figure 8:
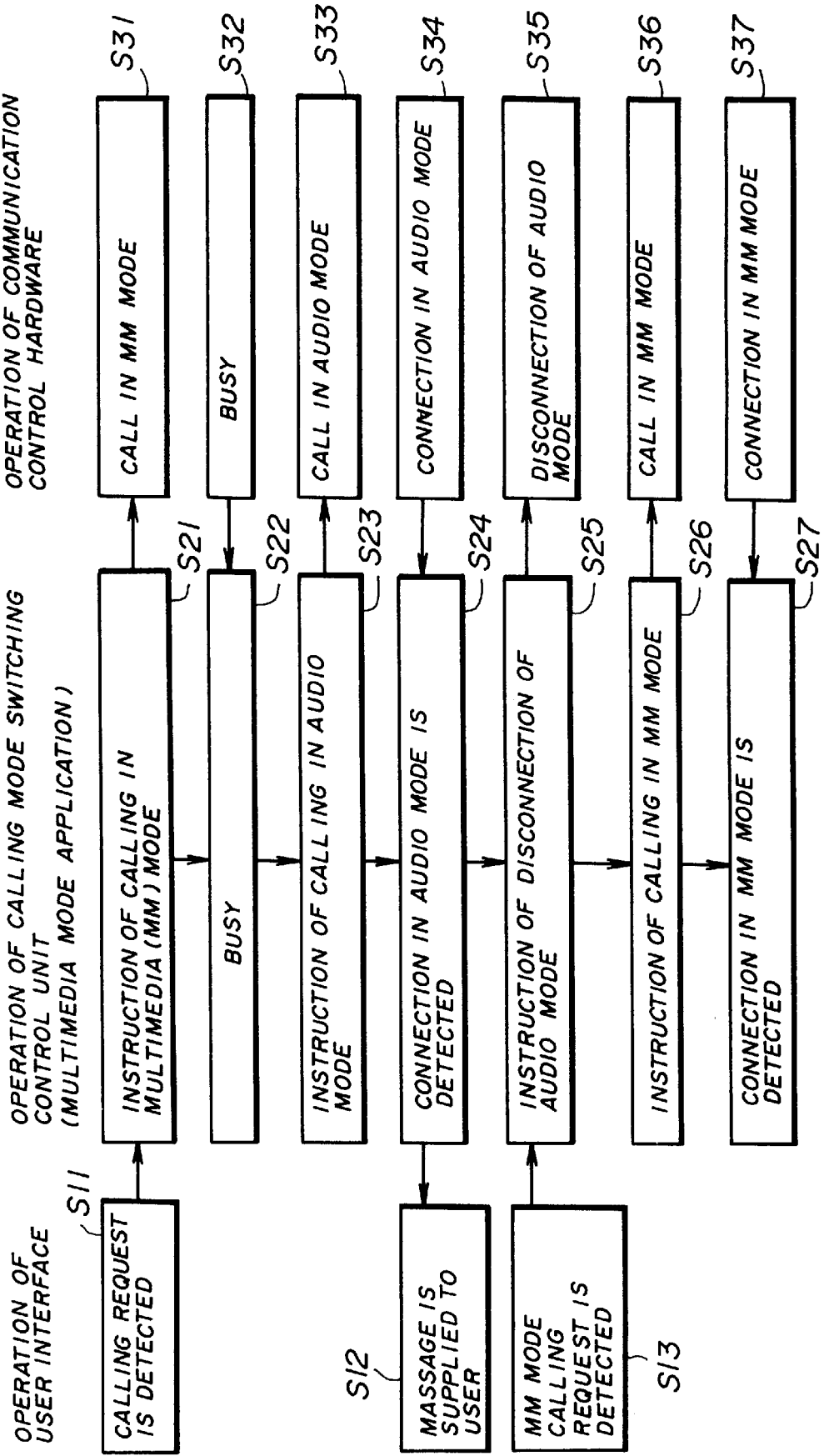
FIG. 8 is a flowchart illustrating a processing procedure in a terminal called in a multimedia mode in the system shown in FIG. 7.
Figure 9:
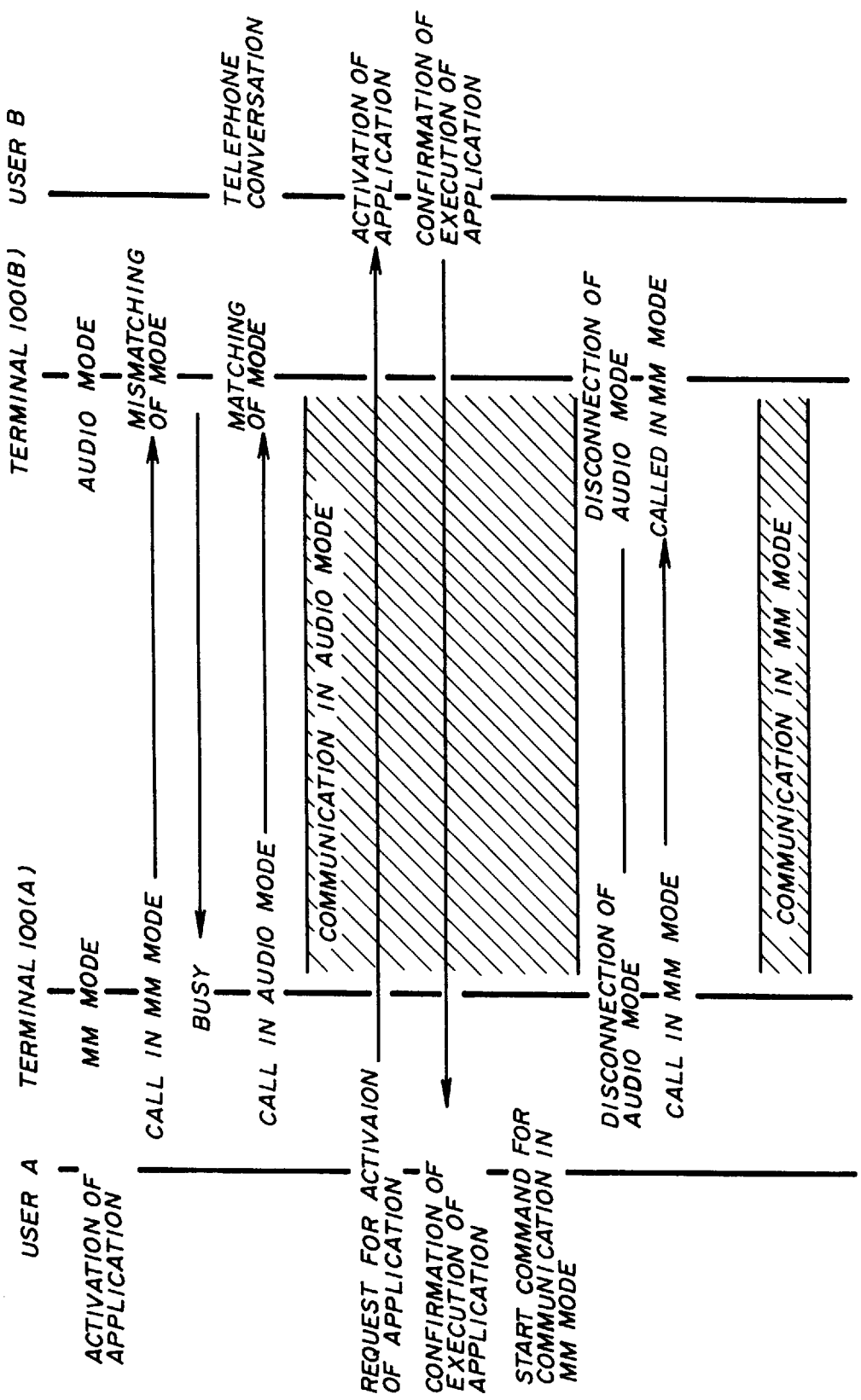
FIG. 9 is a diagram illustrating a communication procedure between terminals in the system shown in FIG. 7.

In a state where the multimedia mode application unit 151 is not activated in the terminal 100(B), the user A of the terminal 100(A) requests communication with the terminal 100(B) in multimedia mode. In this case, the personal computer unit 150, the user interface in the personal computer unit 150 and the communication control hardware 114 perform processes in accordance with procedures shown in FIG. 8. In addition, the communication between the terminals 100(A) and 100(B) is performed in accordance with procedures shown in FIG. 9.

Based on operations of the user A, the multimedia mode application 151 of the terminal 100(A) is activated. The user A further operates the terminal 100(A) to call the terminal 100(B). When the user interface of the personal computer unit 150 detects a calling request in the multimedia mode (S11 in FIG. 8), an instruction for calling in the multimedia mode is supplied to the multimedia mode application unit 151 (S21 in FIG. 8). The personal computer unit 150 then starts a process for the multimedia mode and performs a calling process. A call for the terminal 100(B) is output from the communication control hardware 114 to the network (ISDN) 200 (S31 in FIG. 8). In the terminal 100(B), the multimedia mode application unit 151 is not activated, so that the call from the terminal 100(A) can not be received. Thus, in the terminal 100(A), the communication control hardware 114 which is searching for call control messages in the ISDN detects that the call for the terminal 100(B) is busy (S32 in FIG. 8). Based on the detecting result, the multimedia mode application unit 151 recognizes that the call for the terminal 100(B) is busy.

After this, the software for switching control of the calling mode in the multimedia mode application unit 151 automatically supplies to the communication control hardware 114 an instruction to output a call in the audio mode. The communication control hardware 114 which receives the instruction outputs the call for the terminal 100(B) in the audio mode to the network (ISDN) 200 (S33 in FIG. 8). The terminal 100(B) can receives a call in the audio mode without regard to the execution of the application, so that the terminal 100(B) which receives the call is connected to the network (ISDN) 200 in the audio mode. The communication control hardware 114 of the terminal 100(A) detects, based on the response from the terminal 100(B), that the terminal 100(B) has been connected to the network (ISDN) 200 in the audio mode (S34 in FIG. 8). The software for switching control of the calling mode in the multimedia mode application unit 151 recognizes that the terminal 100(B) has been connected to the network (ISDN) 200 in the audio mode (S24 in FIG. 8).

At this time, the user A of the terminal 100(A) and the user B of the terminal 100(B) can talk to each other using the hand-sets 160 (a state capable of communication in the audio mode). Based on the above recognition result, the user interface of the personal computer unit 150 informs the user A that the multimedia mode application unit 151 of the terminal 100(B) is not activated (a message is displayed on a display screen) (S12 in FIG. 8). The user A informed of this matter requests the user B of the terminal 100(B), using the hand-set 160, to activate the multimedia mode application unit 151 of the terminal 100(B).

The user B operates the terminal 100(B) so that the multimedia mode application unit 151 is activated. The user B confirms that the application is executed, and informs the user A, by speech, that the multimedia mode application unit 151 is activated. The user A, who confirms that the application is executed in the terminal 100(B), carries out an input operation for a communication request in the multimedia mode. When the user interface of the personal computer unit 150 detects the communication request in the multimedia mode (S13 in FIG. 8), the software for switching control of the calling mode in the multimedia mode application unit 151 supplies to the communication control hardware 114 an instruction for disconnecting the audio mode (S25 in FIG. 8). The communication control hardware 114 outputs to the network (ISDN) 200 a message, for the terminal 100(B), that the audio mode is disconnected (S35 in FIG. 8). As a result, the communication in the audio mode between the terminals 100(A) and 100(B) is disconnected.

After supplying the instruction for disconnecting the audio hardware, the multimedia mode application unit 151 supplies to the communication control hardware 114 an instruction for a call in the multimedia mode. Based on this instruction, the communication control hardware 114 outputs a call for the terminal 100(B) in the multimedia mode to the network (ISDN) 200 (S36 in FIG. 8).

In the terminal 100(B) which receives the call in the multimedia mode, the multimedia mode application unit 151 has been activated, so that the call is acceptable to the terminal 100(B). As a result, the terminal 100(B) is connected to the network (ISDN) 200 in the multimedia mode. The communication control hardware 114 of the terminal 100(A) detects a state where the terminal 100(B) connected to the network (ISDN) in the multimedia mode (S37 in FIG. 8). Based on the detected result, the multimedia mode application unit 151 of the terminal 100(A) recognizes that the terminal 100(B) has been connected to the network (ISDN) 200 in the multimedia mode (S27 in FIG. 8). The terminals 100(A) and 100(B) communicate with each other in the multimedia mode.

In the above process, the user A need not recognize whether the communication mode is the audio communication mode or the multimedia mode. The terminal 100(A), to which the start instruction for the communication is supplied from the user A, recognizes that the present communication mode is the audio communication mode, so that the terminal 100(A) retries a call for the terminal 100(B) in the multimedia mode. If one B-channel of the ISDN is unused, the call may be performed using it. If there is no unused B-channel, after the call which has been connected in the audio communication mode is disconnected so that the unused B-channel is obtained, a call may be performed in the multimedia mode.

In order to enable smooth communication between the users A and B, it is preferable that the communication mode is changed from the audio communication mode to the multimedia mode for a sufficiently short time (e.g., about 1 second).

According to the above embodiment, the users A and B need not recognize whether the terminals 100(A) and 100(B) are connected to the network in the audio mode or the multimedia mode. In accordance with an instruction supplied to a terminal, the communication between terminals can be performed in the multimedia mode.

The present invention is not limited to the aforementioned embodiments, and other variations and modifications may be made without departing from the scope of the claimed invention.

What is claimed is:

1. A communication system comprising:
   a first communication terminal connected to a network in which communication can be performed in a plurality of modes; and
   a second communication terminal connected to the network, wherein said first communication terminal comprises:

detecting means for detecting that a call performed in a first mode for said second communication terminal, in which a second mode has been set, is refused by said second communication terminal;

first calling means for searching for the second mode set in said second communication terminal and calling for said second communication terminal in the second mode when said detecting means detects that the call is refused by said second communication terminal;

mode switching instruction means for instructing, using the second mode, said second communication terminal to switch from the second mode to the first mode when the call by said first calling means is accepted by said second communication terminal; and second calling means for calling second communication terminal in the first mode when receiving from said second communication terminal a response to an instruction from said mode switching instruction means; and wherein said second communication terminal comprises:

mode switching response means for returning to said first communication terminal a response to the instruction using the second mode when receiving instruction from said mode switching instruction means of said first communication terminal; and mode switching means for switching from the second mode to the first mode after said mode switching response means returns the response.

2. The communication system as claimed in claim 1, wherein the second mode is an audio communication mode in which voice communication can be performed, and wherein said mode switching instruction means of said first communication terminal has first DTMF generating means for generating dual tone multi-frequency button dialing signals (DTMF) representing the instruction.

3. The communication system as claimed in claim 2, wherein said mode switching response means of said second communication terminal has second DTMF generating means for generating dual tone multi-frequency button dialing signals (DTMF) representing the response.

4. A communication terminal connected to a network in which communication can be performed in a plurality of modes, said communication terminal comprising:

detecting means for detecting that a call performed in a first mode for another communication terminal in which a second mode has been set is refused by said another communication terminal;

first calling means for searching for the second mode set in said another communication terminal and calling for said another communication terminal in the second mode when said detecting means detects that the call is refused by said another communication terminal;

mode switching instruction means for instructing, using the second mode, said another communication terminal to switch from the second mode to the first mode when the call by said calling means is accepted by said another communication terminal; and second calling means for calling said another communication terminal in the first mode when receiving from said another communication terminal a response to an instruction from said mode switching instruction means.

5. The communication terminal as claimed in claim 4, wherein the second mode is an audio communication mode in which voice communication can be performed, and wherein said mode switching instruction means has first DTMF generating means for generating dual tone multi-frequency button dialing signals (DTMF) representing the instruction.

* * * * *